United States Patent Office 3,792,138
Patented Feb. 12, 1974

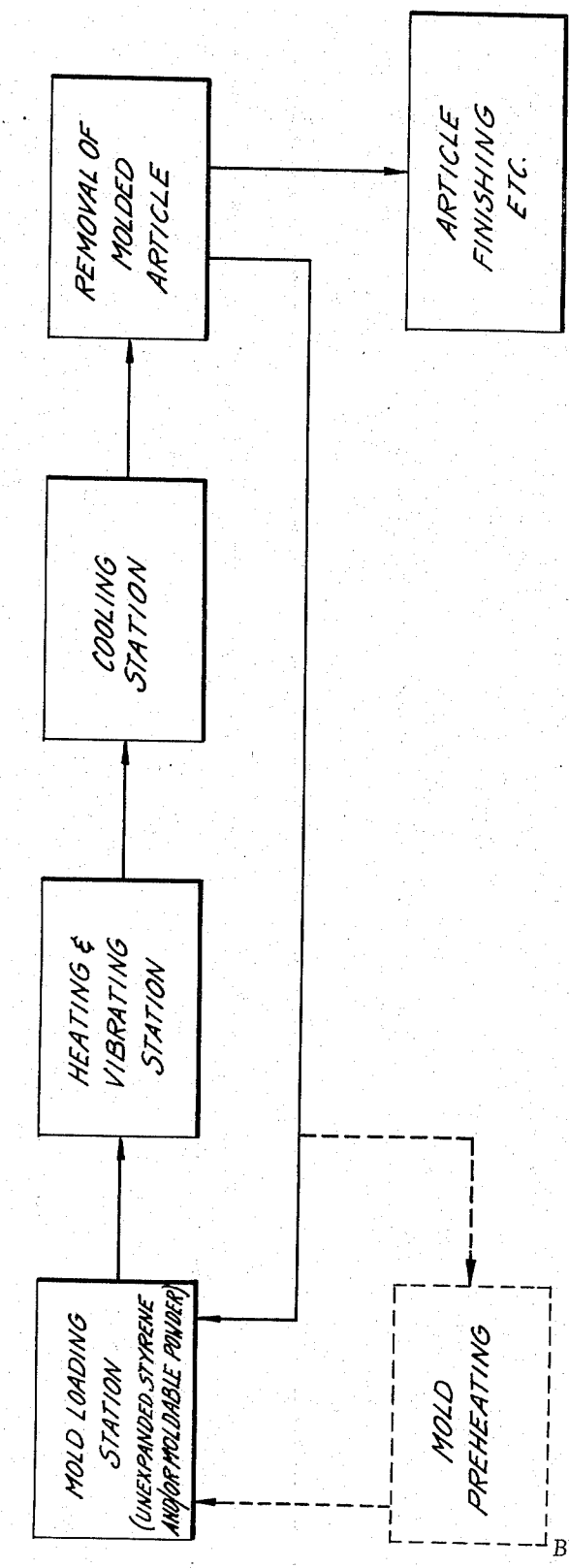

3,792,138
PROCESS OF MOULDING FOAMABLE MATERIALS BY SIMULTANEOUSLY HEATING AND VIBRATING THE MOLD
Sidney G. Lammers, Liverpool, N.Y., assignor to Dart Industries, Inc., Los Angeles, Calif.
Filed July 15, 1969, Ser. No. 841,873
Int. Cl. B29d 27/100
U.S. Cl. 264—46         8 Claims

ABSTRACT OF THE DISCLOSURE

A process for the formation of expandable thermoplastic synthetic resins employs vibration to assure a uniform article construction. The particular article mold cavity is loaded with unexpanded resin beads and is simultaneously vibrated and heated until the beads have been fully expanded. The process further enables a user to create laminations within a molded article by using expandable beads of different densities or other similar moldable materials.

---

The present invention relates to the molding of thermoplastic materials of the type which employs an expanding medium to increase the volume of the material upon the application of heat. More particularly, the invention contemplates the use of such materials which have not been pre-expanded and which will undergo their full expansion during the actual molding thereof.

Expandable thermoplastic synthetic resins, and in particular polystyrene, have recently come into general use for all types of bodies which may suitably employ its cellular characteristics. These thermoplastic materials are used in sheet form for insulation and may be molded into various shaped articles in which advantage may be taken of its low density, relatively high mechanical strength and pleasing appearance. Typical shaped bodies include boat hulls, articles of furniture, packing cases, toys and decorator items. Another important use of these expandable resins is in the production of hot/cold storage receptacles where particular advantage may be taken of the low thermal conductivity characteristics of the expanded resins.

In general, the prior art processes for molding expandable thermoplastics have included the following steps: (1) pre-expansion of the thermoplastic beads (e.g., polystyrene) in which the expanding medium is partially volatized; (2) ageing of the pre-expanded beads which will prevent shrinkage at the time of subsequent molding; and (3) molding of the pre-expanded and aged beads which are usually only partially expanded.

This process is particularly well adapted for the production of articles of a very low density, for example, on the order of between 1 and 10 pounds per cubic foot. This, although quite satisfactory in many respects, has somewhat restricted the use of expandable thermoplastic resins. In many instances, it is desirable to increase article densities, especially where improved surface details and characteristics are required. It has also been conceived that to accomplish this end, it might be desirable to laminate various different resins having different specific gravities or the same resin which were of different specific gravities.

Accordingly, this invention, among other things, contemplates a molding process and article of manufacture having a density of up to about 30 pounds per cubic foot. The production process for such an expanded thermoplastic article includes the step of simultaneously heating and vibrating unexpanded thermoplastic resin beads in a loose noncompressed state. The process further envisions the manufacture of laminated articles of different thermoplastics or of the same material having different specific gravities.

It is, therefore, an important object of the invention to expand the scope of usage of cellular or expanded thermoplastic and powdered resins.

Another object is to provide a new molding process or technique which will enable production of an article in which expansion has been uniform.

A further object is to produce a smooth-skinned closed cell foam of controlled density, registering every detail of an intricate mold.

These objects and advantages will become more apparent upon continuing reference to the following detailed description and drawing in which:

FIG. 1 is a schematic flow diagram illustrating the process of the invention.

In accordance with the present invention, it is preferred that employment be made of styrene polymers, however, other expandable thermoplastic resins may be satisfactorily used. For example, the invention may be carried into effect using expandable cellulose acetate, polyethylene, and other similar materials.

Returning for a moment to the preferred styrene polymers, it should be noted that this refers to homopolymeric polystyrene as well as copolymers of styrene with other copolymerizable monomers such as the conjugated 1,3-dienes, e.g., butadiene, isoprene, and the like, $\alpha,\beta$-unsaturated monocarboxylic acids and derivatives thereof, e.g., acrylic acid, methyl acrylate, ethyl acrylate, butyl acrylate, 2-ethyl hexyl acrylate, and the corresponding esters of methacrylic acid, acrylamide, methyl acrylamide, acrylonitriles, methacrylonitrile, and the like, vinyl halides, vinyl acetate and mixtures thereof. In any of the above type resins, all or a portion of the styrene may be replaced with its closely related homologues, such as alpha-methylstyrene, ortho, meta, and para-methylstyrene, ortho, meta and para-ethylstyrenes, 2,4-diethylstyrenes, and the like. The copolymers can contain up to 75 percent of a comonomer such as exemplified above and 25 percent styrene; however, it is preferred that styrene be present in a major portion and most preferably in amounts greater than 75 percent styrene. In general, the styrene polymers employed are preferably those having a molecular weight in the range of about 30,000 to 200,000 and are not tacky or flexible at about 50° F.

The foaming agents which render the particulate styrene polymer expandable are those liquid hydrocarbons which are low boiling non-solvents for the styrene polymers and having a boiling point below the softening temperature of the styrene polymer. Aliphatic hydrocarbons whose boiling points are below the softening temperature and are nonsolvents for the styrene polymer particles are most suitable in the process of the present invention. Aliphatic hydrocarbons such as butane, pentane, hexane, heptane, petroleum ethers, and the like and cycloaliphatics such as cyclopentane and cyclohexane, are most preferred. It has been found that the minimum amount of foaming agent required to be absorbed in the polymer to produce foaming, is about 1% by weight; however, it is considered preferable to have the foaming agent present in the polymer in amounts of from about 3 to about 8 percent by weight, although a greater percentage can also be absorbed.

Referring now to FIG. 1, it may be seen that the overall process includes mold loading with unexpanded styrene polymer beads, simultaneously heating and vibrating the loaded mold, cooling of the mold, and removal of the foamed article from the mold. As will be appreciated, the molded article may, subsequent to molding, undergo a variety of finishing steps which generally depend upon the particular class and type of article.

Of primary importance is the fact that to produce articles of the invention, unexpanded resin beads are used and the mold within which such beads are placed is heated and vibrated simultaneously to effect their expansion. It is further contemplated that the mold will be positioned on a vibrating table or surface area which is bottom heated by a plurality of strip type heaters that are commercially known and available from the trade. Similarly, well known vibratory equipment may be employed in construction of a suitable vibrating table or surface area.

It should, however, be pointed out that additional or other heating techniques may be employed in carrying out the invention. For example, it may in some instances be appropriate to introduce steam directly into the mold cavity or to, in some other manner, preheat the mold. Each of these procedures will satisfactorily expand the styrene or other thermoplastic material in the manner described if temperatures approximating 200–300° F. are experienced in the mold cavity. Molding time, of course, will vary depending upon method of heating, type of material, amount of material, size of the article, etc. Times ranging from a few seconds to several minutes are common in carrying out the invention.

As indicated, the vibration of the mold and its encased beads is a major contributing factor in obtaining polystyrene articles having a density range of up to about 30 pounds per cubic foot. This, coupled with the fact that the beads employed are not pre-expanded, enables the user to obtain higher density values. In addition, it is theorized that this also contributes to improved article surface characteristics and, of course, a uniform density throughout the product. A preferred density has been found to be between 8 and 20 pounds per cubic foot.

Likewise, in those cases where it may be desirable to use different resins or resins having different properties, the vibration will tend to evenly distribute the beads in such manner that substantially uniform lamina result. In this aspect of the invention, laminations will be produced simply by using beads of varying specific gravities or beads and molding powders. The higher specific gravity materials will segregate in the lower mold cavity areas. And those beads having successively lesser values will tend to form layers thereabove.

It is anticipated that in most instances, use will be made of this laminating technique in order to provide particular material surface characteristics. This is the case where especially different characteristics from those that might be obtained with the primary article constituent are considered to be desirable.

The frequency of vibration employed also depends upon the material being molded as well as article size, etc., but is not limiting. It is, however, evident that better distribution of beads within the mold and overall uniformity is obtained when higher frequencies are employed. It is further theorized that during the molding step the vibration assists in forcing the unexpanded material toward the top of the mold. This also aids in the complete filling of the mold and in obtaining the best registration of intricate details within the mold.

Mold cooling can be effected in any suitable manner. Examples include internal (built-in) forced fluid cooling, exterior forced fluid (air or liquid) cooling and simply ambient air cooling. Cooling times will vary depending upon the method employed and the provisions for such cooling as are built into the mold. Times may range between 1 and 30 minutes, but it is desirable to cool below 120° F. before releasing the piece from the mold.

It might also be pointed out that the styrene polymer beads may be wetted with water or wetting agents to further improve movement of the beads within the vibrating mold. It has also been found possible to decorate articles made in accordance with the invention with both water and solvent based materials.

The following examples are included to further illustrate the invention but are not to be construed as imposing any limitations thereon.

EXAMPLE I

An aluminum mold is filled with 45 grams of Rexall Expandable Styrene Beads and a bottom backing plate is firmly affixed to the mold. Three Chromalox strip heaters are attached to the bottom backing plate approximately 1½" apart. These heaters are subsequently attached to a 120 volt, 300 watt potentiometer. This mold arrangement is placed upon a vibrating table set for maximum vibration. Full power is applied to the heaters for 9 minutes while the mold is vibrated. After cooling and upon demolding, the article is found to have excellent surface details and to have a density of approximately 30 pounds per cubic foot.

EXAMPLE II

Substantially the same procedure as is described in Example I is followed except that after 11 minutes heating is discontinued and vibration is continued for an additional 4 minutes as cooling begins. Again excellent article surface detail and high density is obtained.

EXAMPLE III

Substantially the same procedure as is described in Example I except that the mold is loaded with 35 grams of Rexall Expandable Styrene Beads and 15 grams of A.B.S. Another exceptional high density article is produced in which there is a uniform back skin of A.B.S.

EXAMPLE IV

Substantially the same procedure as is described in Example I except that the mold is loaded with 30 grams of Rexall Expandable Styrene Beads and 10 grams of polyethylene. After 12 minutes of vibration with full electrical power and 3 minutes without heat, the demolded article may be seen to have a high density and fine surface characteristics with a polyethylene skin.

I claim:

1. A process for making porous cellular thermoplastic bodies, comprising the steps of simultaneously heating and vibrating in a mold in a loose and substantially non-compressed state, unexpanded particles of at least one (thermally expandable) thermoplastic resin to a temperature of between about 200° F. and 500° F. for a period of time that will assure the formation of a unified structure by the substantial expansion of said resin.

2. A process as defined in claim 1 wherein the unified structure is cooled subsequent the heating and vibrating step.

3. A process as defined in claim 1 wherein the thermoplastic resin consists of a styrene polymer resin.

4. A process as defined in claim 1 wherein a plurality of unexpanded thermoplastic resins having differing specific gravities are simultaneosuly heated and vibrated, thus producing a laminar effect within the body.

5. A process as defined in claim 4 wherein the thermoplastic resins consist of the group selected from cellulose acetate, polyethylene, polystyrene, and copolymers of styrene.

6. A process as defined in claim 2 wherein cooling is effected by employing a forced fluid medium.

7. A process as defined in claim 1 wherein at least one other unexpandable thermoplastic resin is simultaneously heated and vibrated with said one thermoplastic resin.

8. A process for making porous cellular polystyrene bodies, comprising the steps of simultaneously heating and vibrating in a mold in a loose and substantially non-compressed state, expandable polystyrene beads to a temperature of between about 200° F. and 500° F. for a period of time that will assure the formation of a unified structure by the expansion of said polystyrene beads.

References Cited

UNITED STATES PATENTS

| | | | |
|---|---|---|---|
| 2,297,504 | 9/1942 | Salvaneschi | 264—71 |
| 2,865,800 | 12/1958 | Stastny | 264—46 |
| 2,950,505 | 8/1960 | Frank | 264—45 |
| 2,954,589 | 10/1960 | Brown | 264—46 |
| 3,088,713 | 5/1963 | Gard | 264—Dig. UX |
| 3,256,373 | 6/1966 | Horst | 264—71 X |
| 3,344,011 | 9/1967 | Goozner | 264—71 X |
| 3,348,278 | 10/1967 | Jankovsky et al. | 264—71 X |
| 3,458,610 | 7/1969 | Sainty | 264—71 X |

FOREIGN PATENTS

| | | | |
|---|---|---|---|
| 623,812 | 7/1961 | Canada | 264—53 |

ROBERT F. WHITE, Primary Examiner

J. B. LOWE, Assistant Examiner

U.S. Cl. X.R.

264—53, 71, Dig. 10, Dig. 13